US006343089B1

(12) United States Patent
Manos et al.

(10) Patent No.: US 6,343,089 B1
(45) Date of Patent: Jan. 29, 2002

(54) MICROWAVE-DRIVEN ULTRAVIOLET LIGHT SOURCES

(75) Inventors: Dennis M. Manos, Williamsburg; Jessie Diggs, Norfolk; Joseph D. Ametepe, Roanoke, all of VA (US)

(73) Assignee: College of William & Mary, Williamsburg, VA (US)

( * ) Notice: Subject to any disclaimer, the term of this patent is extended or adjusted under 35 U.S.C. 154(b) by 0 days.

(21) Appl. No.: 09/382,843

(22) Filed: Aug. 25, 1999

(51) Int. Cl.[7] ................................................ H01S 3/097

(52) U.S. Cl. ............................ 372/82; 372/34; 372/55; 372/5; 372/92

(58) Field of Search ................................ 372/82, 92, 5, 372/34, 55

(56) References Cited

U.S. PATENT DOCUMENTS

| | | | |
|---|---|---|---|
| 4,249,143 A | | 2/1981 | Eden |
| 4,258,334 A | | 3/1981 | McCusker et al. |
| 4,802,183 A | | 1/1989 | Harris et al. |
| 4,829,536 A | | 5/1989 | Kajiyama et al. |
| 4,866,346 A | | 9/1989 | Gaudreau et al. |
| 5,081,635 A | | 1/1992 | Wakabayashi et al. |
| 5,359,621 A | | 10/1994 | Tsunoda et al. |
| 5,659,567 A | | 8/1997 | Roberts et al. |
| 5,686,789 A | | 11/1997 | Schoenbach et al. |
| 5,686,793 A | | 11/1997 | Turner et al. |
| 5,781,289 A | | 7/1998 | Sabasabi et al. |
| 5,802,093 A | * | 9/1998 | Townsend et al. ............ 372/55 |
| 5,803,975 A | | 9/1998 | Suzuki |
| 5,838,108 A | | 11/1998 | Frank et al. |
| 5,847,517 A | | 12/1998 | Ury et al. |
| 5,889,807 A | * | 3/1999 | Cunningham et al. ........ 372/55 |

OTHER PUBLICATIONS

Joseph D. Ametepe, Jessie Diggs, Dennis M. Manos, and Michael J. Kelley, "Characterization and Modeling of a Microwave Driven Xenon Excimer Lamp," Journal of Applied Physics, Jun. 1, 1999, vol. 85, No. 11, pp. 7505–7510.

* cited by examiner

*Primary Examiner*—Leon Scott, Jr.
(74) *Attorney, Agent, or Firm*—Joy L. Bryant

(57) ABSTRACT

A microwave-driven ultraviolet (UV) light source is provided. The light source comprises an over-moded microwave cavity having at least one discharge bulb disposed within the microwave cavity. At least one magnetron probe is coupled directly to the microwave cavity.

19 Claims, 3 Drawing Sheets

MICROWAVE-DRIVEN ULTRAVIOLET LIGHT SOURCES

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of SURA Contract No. 94D8358901 awarded by the Department of Energy.

FIELD OF THE INVENTION

The present invention relates to ultraviolet (UV) light sources. In particular, it relates to microwave-driven ultraviolet light sources.

BACKGROUND OF THE INVENTION

Excimers are diatomic molecules or complexes of molecules that have stable excited states with an unbound or weakly bound ground state. In principle, they can be formed by all rare gases and rare-gas halogen mixtures and in most cases, the reaction kinetics leading to the excimer is selective. Because these complexes are unstable, they disintegrate within a few nanoseconds converting their excitation energy to spontaneous optical emission. Re-absorption of this light cannot occur because these complexes have no stable ground state. In turn, it is possible to construct excimer lamps emitting light with a high intensity within narrow spectral regions in the deep ultraviolet (UV) region. Many materials absorb radiation at less than approximately 250 nm, making UV or visible-UV (VUV) sources important. In turn, these sources can selectively drive radical-mediated processes such as: UV curing, metal depositions, protective and functional coating, pollution control, photo-deposition of amorphous semiconductors, and photo-deposition of dielectric layers.

Many excitation techniques for excimer sources have been studied. Among them, microwave-drive is especially appealing because the underlying technology has been so extensively developed for other purposes and because no electrodes are needed, prospectively enabling long bulb life at high power.

Microwave-drives operating at frequencies above 1 GHZ require a carefully designed cavity for efficient coupling of the microwave energy into the discharge. This condition makes it difficult and expensive to increase the size and to construct an efficient UV source.

Therefore, it is an object of the present invention to provide a microwave-drive that does not require the use of wave guides, directional couplers, or tuners.

Another object of the present invention is to provide an over-moded microwave cavity wherein the probe of the magnetron is directly coupled to the cavity.

SUMMARY OF THE INVENTION

By the present invention, a microwave-driven ultraviolet (UV) light source is provided. The light source comprises an over-moded microwave cavity having at least one discharge bulb disposed within the microwave cavity. At least one magnetron probe is coupled directly to the microwave cavity.

In use, the microwave-driven UV light source is provided. A gas capable of forming an electronically excited molecular state is introduced into each discharge bulb. Pressure is applied at a range from about 10 Torr to about 50 Atm and power is input at up to about 50 kW.

Since the probe of the magnetron is directly coupled into the microwave cavity, it operates in an over-moded fashion, i.e., no one particular mode dominates. In turn, the over-moded operation eliminates the need for precise tuning during operation on a manufacturing floor, where the temperature and other environmental factors may vary. The design further eliminates the need for very precise control of the bulb shape and placement, offering easier maintenance and reliability. Lastly, the arrangement offers the highest likelihood of distributing power evenly between a multiplicity of bulbs sharing a common cavity.

Additional objects and advantages of the invention will be set forth in part in the description which follows, and in part will be obvious from the description, or may be learned by practice of the invention. The objects and advantages of the invention will be obtained by means of instrumentalities in combinations particularly pointed out in the appended claims.

BRIEF DESCRIPTION OF THE DRAWINGS

The accompanying drawings illustrate a complete embodiment of the invention according to the best modes so far devised for the practical application of the principles thereof, and in which.

DETAILED DESCRIPTION OF THE PREFERRED EMBODIMENTS

Figure 1:
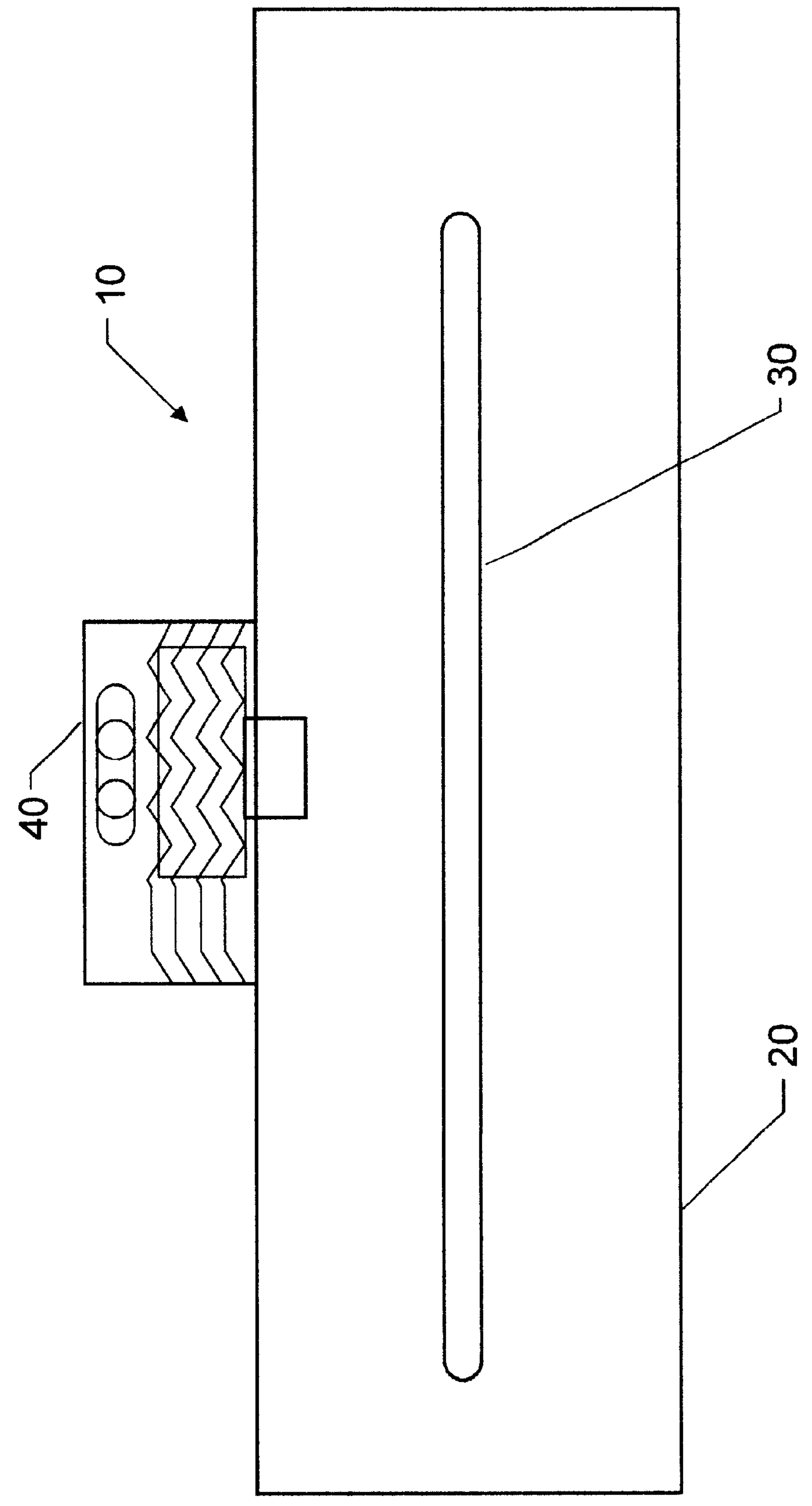
FIG. 1 is a side view of a preferred embodiment of the present invention.

Referring now to the drawings wherein similar elements are numbered the same throughout. FIG. 1 is a side-view of a preferred embodiment of the present invention. In its simplest configuration, the microwave-driven ultraviolet light source 10 comprises an over-moded microwave cavity 20 having a discharge bulb 30 disposed within the microwave cavity 20. A magnetron probe 40 is coupled directly to the microwave cavity 20.

Figure 2:
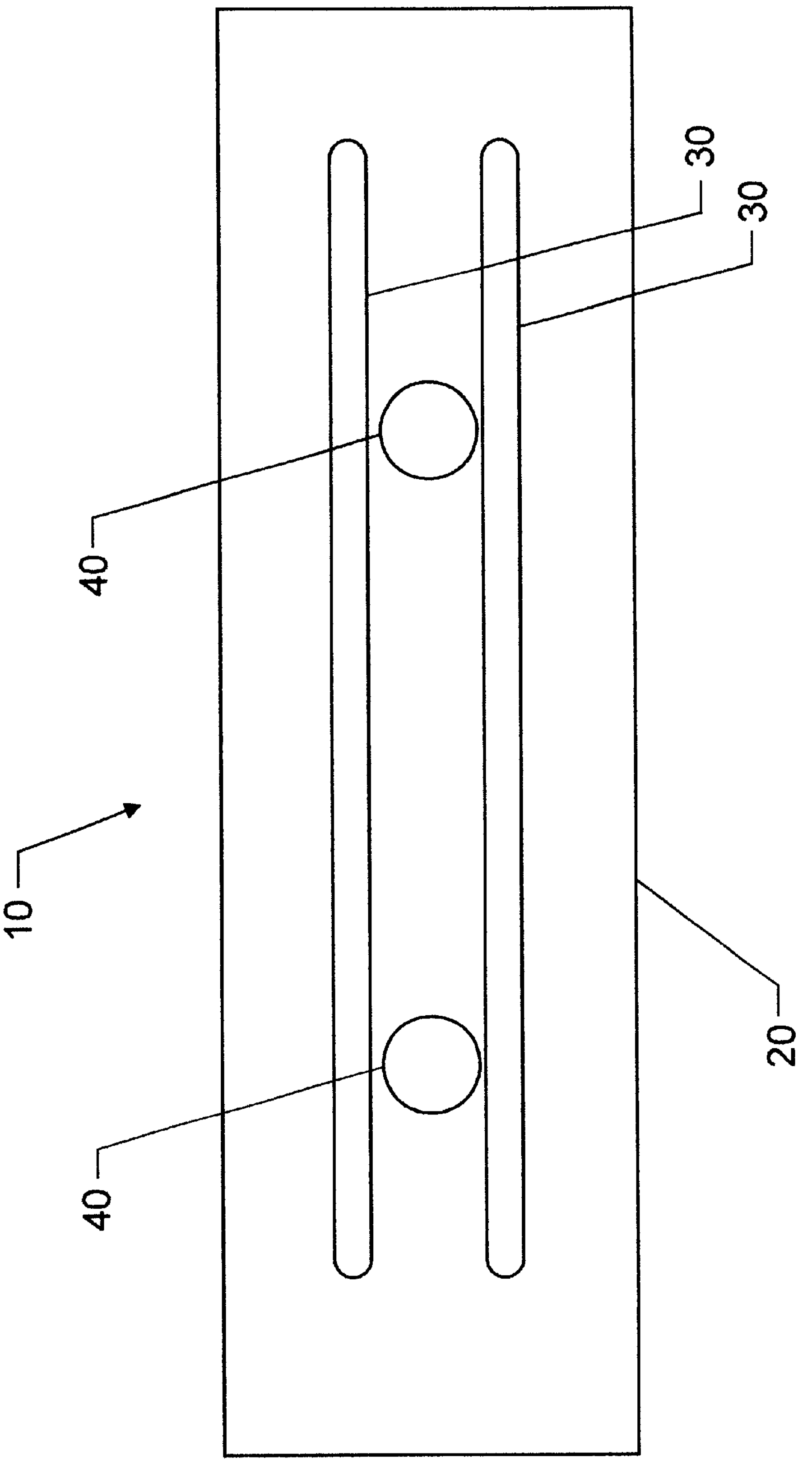
FIG. 2 is a bottom view of an alternative embodiment of the present invention.

Alternatively, FIG. 2 depicts another embodiment of the invention wherein the microwave-driven ultraviolet light source 10 comprises an over-moded microwave cavity 20 having more than one, in this example two, discharge bulbs 30 disposed within the microwave cavity 20. In addition, more than one, in this embodiment two, magnetron probes 40 are coupled directly to the microwave cavity 20. Although two discharge bulbs and two magnetron probes are shown in the figure, any number of discharge bulbs and magnetron probes may be used depending on the final application.

The microwave cavity 20 operates in an over-moded fashion. By over-moded it is understood that no particular mode dominates. The cavity has uniform power throughout. In turn, the discharge bulb 30 may be placed at any point in the cavity 20. The ability to place the discharge bulb at any point in the cavity affords a tremendous advantage over previous arrangements where discharge bulb placement is critical.

Any discharge bulb known to those skilled in the art may be used in the present invention. In addition, there is no restriction on the number of discharge bulbs used provided that ample power is supplied to ignite the gas in the bulbs. In one embodiment, each discharge bulb comprises an open-ended, UV-transparent tube having a gas volume ranging from about 25 $cm^3$ to about 66 $cm^3$. Alternatively, each discharge bulb comprises a sealed, UV-transparent tube having a gas volume ranging from about 25 $cm^3$ to about 66 $cm^3$. Typically, the discharge bulb is made of quartz. Each discharge bulb contains a gas capable of forming an electronically excited molecular state. Any gas known to those skilled in the art may be used. In particular, the gas is selected from the group consisting of: a noble/halide gas mixture; a neon gas; a helium gas; a xenon gas; a krypton gas; and an argon gas. The gas may be used in its pure form or in mixed combinations. In particular, the noble/halide gas mixture is used at a ratio ranging from about 100 percent by volume noble gas : 0 percent by volume halide gas to about 90 percent by volume noble gas: 10 percent by volume of halide gas.

The magnetron probe 40 is coupled directly to the microwave cavity. Although only one probe is shown, more than one probe may be used as shown in FIG. 2. Preferably, the magnetron probe is a 2.45 GHZ magnetron. This configuration permits the cavity to operate in an over-moded fashion over a wide pressure range (from about 10 Torr to about 50 Atm) with power input up to about 50 kW.

In an additional embodiment of the invention, a cooling gas may be introduced into the microwave cavity. The cooling gas purges light absorbing gases from the microwave cavity. Any cooling gas may be used, however, preferably the cooling gas is a two-phase cryogenic stream. For example, the cooling gas may be liquid nitrogen boil-off. Alternatively, the cooling gas may simply be forced air. The introduction of a cooling gas helps to effectively cool the bulb, displace any oxygen or other light absorbing gases that may be present, and permit the UV light produced to more effectively pass from the bulb to the workpiece.

The microwave-driven ultraviolet light source may be used to produce an excimer emission. In doing so, a microwave-driven ultraviolet light source is provided. If an open-ended, UV-transparent discharge bulb is used, a gas capable of forming an electronically excited molecular state must be introduce into the bulb and pressure from about 10 Torr to about 50 Atm must be applied before inputting up to about 50 kW of power. For a sealed, UV-transparent discharge bulb, the gas capable of forming an electronically excited molecular state is pre-loaded into the bulb and the bulb is pressurized up to about 1 Atm before placement in the over-moded microwave cavity and inputting power up to about 50 kW.

EXAMPLE

Figure 3:
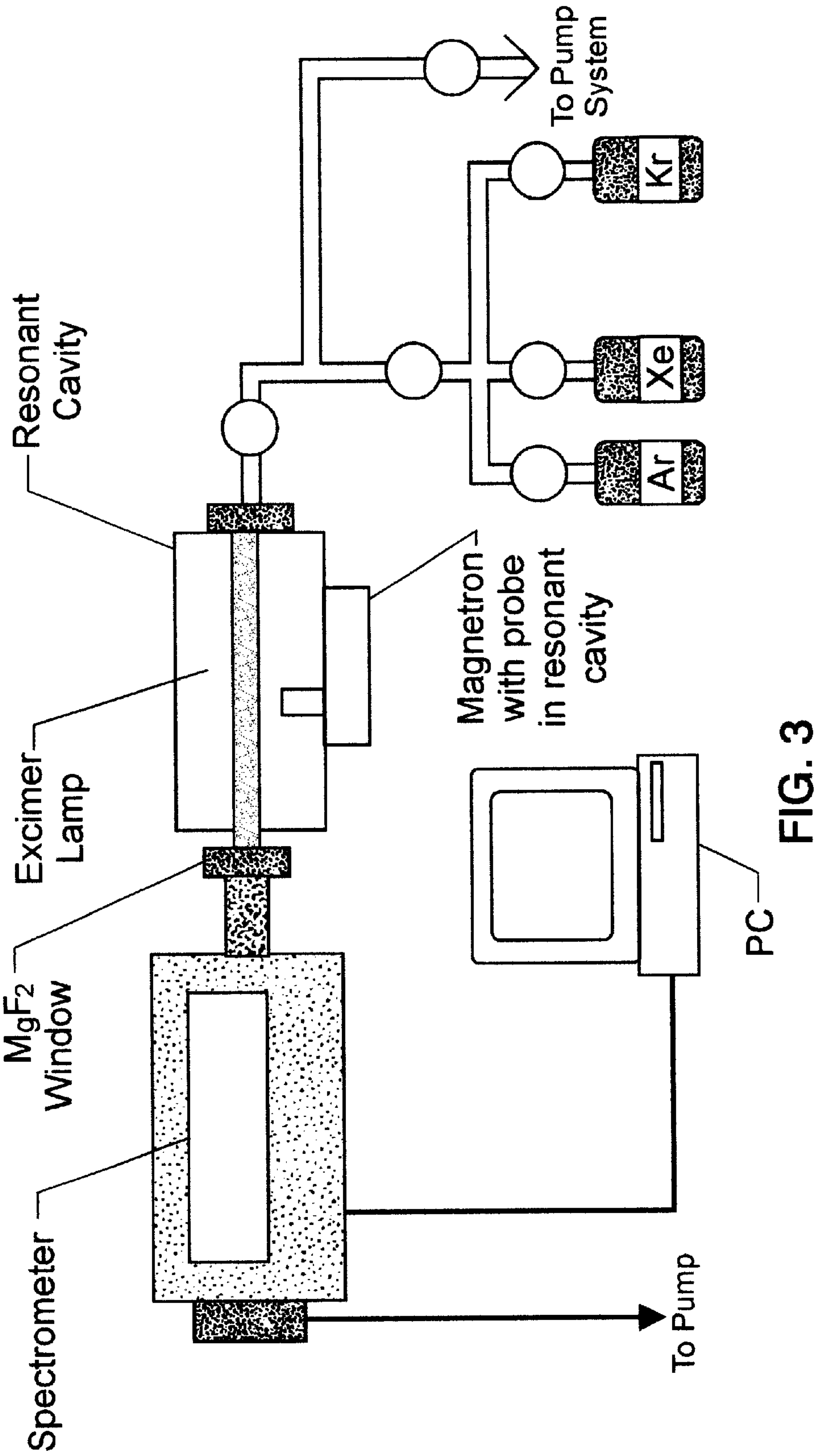
FIG. 3 is a schematic showing an experimental arrangement of the present invention.

FIG. 3 depicts the experimental arrangement of the present invention. The light source consisted of a 2.45 GHz magnetron, an over-moded microwave cavity, and a discharge bulb that passes into the cavity through two long, grounded cylindrical tubes designed to suppress leakage of microwave energy. The probe of the magnetron was directly coupled to the cavity. The discharge bulb was an open-ended, quartz tube, 8 mm outer diameter by 50 cm long with a radiating surface of approximately 125 $cm^2$ and volume of 14.1 $cm^3$. The gas in the lamp was not circulated. Air or liquid nitrogen boil-off was circulated to provide cooling along the length of the discharge bulb.

A spectrometer based on a 0.3 m McPherson Model 218 scanning monochromator was constructed. It was equipped with a 1200 lines/mm plane grating blazed at 200 nm providing spectral resolution of about 0.05 nm. A turbo pump, backed by a mechanical pump, evacuated the system to pressures below $10^{-5}$ Torr for vacuum or controlled atmosphere operation. The detector was a Hamamatsu R928 photomultiplier tube with a sodium salicylate scintillator.

Light from the light source reaches the spectrometer through a 4 mm inner diameter nitrogen purged tube to overcome the absorption of air below 200 nm. One end of the tube contacts the bulb at normal incidence and the other a $MgF_2$ window in front of the entrance slit of the spectrometer or power meter. The tube was 10 cm long and created an effective 2.3 degree angular aperture for the detector.

The discharge bulb was cleansed with isopropyl alcohol and deionized water and then heated to approximately 450 degrees C. under vacuum before introducing research grade xenon (Xe) gas. A general purity check of the gas handling system was performed by monitoring the vacuum UV emission spectra at approximately 200 Torr. No atomic emission from impurity gases was observed. The experiments were restricted to 160 to 320 run. Data was obtained over the pressure range of 100 to 1500 Torr, a typical pressure range for excimer formation. In operation, the temperature of the lamp jacket was controlled by flowing air or cold nitrogen gas (boil off from liquid nitrogen) along the length of the discharge bulb, preventing the bulb from failing.

It was found that electrical efficiency and output power in the 160 to 200 nm range (Xe second continuum) both increased with pressure up to 1500 Torr at 600 W. Cooling with liquid nitrogen boil-off rather than room temperature air more than doubled output power. The electrical efficiency was approximately 20% to 40%.

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:

1. A microwave-driven ultraviolet light source comprising:

an over-moded microwave cavity;

at least one discharge bulb disposed within the microwave cavity; and at least one magnetron probe coupled directly to the microwave cavity.

2. A microwave-driven ultraviolet light source according to claim 1, wherein each discharge bulb comprises an open-ended, UV-transparent tube having a gas volume ranging from about 25 $cm^3$ to about 66 $cm^3$.

3. A microwave-driven ultraviolet light source according to claim 2, wherein each discharge bulb contains a gas capable of forming an electronically excited molecular state.

4. A microwave-driven ultraviolet light source according to claim 3, wherein the gas is selected from the group consisting of: a noble/halide gas mixture; a neon gas, a helium gas, a xenon gas; a krypton gas; and an argon gas.

5. A microwave-driven ultraviolet light source according to claim 1, wherein each discharge bulb comprises a sealed, UV-transparent tube having a gas volume ranging from about 25 $cm^3$ to about 66 $cm^3$.

6. A microwave-driven ultraviolet light source according to claim 5, wherein each discharge bulb contains a gas capable of forming an electronically excited molecular state.

7. A microwave-driven ultraviolet light source according to claim 6, wherein the gas is selected from the group consisting of: a noble/halide gas mixture; a neon gas, a helium gas, a xenon gas; a krypton gas; and an argon gas.

8. A method for producing an excimer emission in a microwave-driven ultraviolet light source, the method comprising the steps of:

a) providing a microwave-driven ultraviolet light source comprising: an over-moded microwave cavity; at least one open-ended, UV-transparent discharge bulb disposed within the microwave cavity; and at least one magnetron probe coupled directly to the microwave cavity;

b) introducing a gas capable of forming an electronically excited molecular state into each discharge bulb;

c) applying pressure ranging from about 10 Torr to about 50 Atm; and d) inputting power up to about 50 kW.

9. A method according to claim 8, further comprising the step of introducing a cooling gas into the microwave cavity.

10. A method according to claim 9, wherein the cooling gas purges light absorbing gases from the microwave cavity.

11. A method according to claim 10, wherein the cooling gas is a two-phase cryogenic stream.

12. A method according to claim 8, wherein the pressure is about 1500 Torr and the input power is about 600 W.

13. A method according to claim 8, wherein the gas is selected from the group consisting of: a noble/halide gas mixture; a neon gas, a helium gas, a xenon gas; a krypton gas; and an argon gas.

14. A method for producing an excimer emission in a microwave-driven ultraviolet light source, the method comprising the steps of:

a) providing a microwave-driven ultraviolet light source comprising: an over-moded microwave cavity; at least one sealed, UV-transparent discharge bulb containing an excimer forming gas and pressurized up to about 1 Atm, wherein each sealed, UV-transparent discharge bulb is disposed within the microwave cavity; and at least one magnetron probe coupled directly to the microwave cavity; and b) inputting power up to about 50 kW.

15. A method according to claim 14, further comprising the step of introducing a cooling gas into the microwave cavity.

16. A method according to claim 15, wherein the cooling gas purges light absorbing gases from the microwave cavity.

17. A method according to claim 16, wherein the cooling gas is a two-phase cryogenic stream.

18. A method according to claim 14, wherein the input power is about 600 W.

19. A method according to claim 14, wherein the gas is selected from the group consisting of: a noble/halide gas mixture; a neon gas, a helium gas, a xenon gas; a krypton gas; and an argon gas.

* * * * *